United States Patent [19]
Hamamichi et al.

[11] Patent Number: 4,742,946
[45] Date of Patent: May 10, 1988

[54] PAPER FEED DEVICE FOR A PRINTER

[75] Inventors: Yoshihiro Hamamichi, Mishima; Takashi Yagi; Yasuo Domoto, both of Shizuoka, all of Japan

[73] Assignee: Tokyo Electric Co., Ltd., Tokyo, Japan

[21] Appl. No.: 806,816

[22] Filed: Dec. 10, 1985

[30] Foreign Application Priority Data

| | | | |
|---|---|---|---|
| Dec. 14, 1984 | [JP] | Japan | 59-189982[U] |
| Dec. 14, 1984 | [JP] | Japan | 59-189983[U] |
| Dec. 18, 1984 | [JP] | Japan | 59-267224 |

[51] Int. Cl.[4] ........ B41J 11/00; G03B 1/22
[52] U.S. Cl. ........ 226/74; 400/616.2
[58] Field of Search ........ 226/196, 74, 70, 181, 226/183, 52; 400/616.1, 616.2

[56] References Cited

U.S. PATENT DOCUMENTS

| | | | |
|---|---|---|---|
| 4,413,764 | 11/1983 | Weber et al. | 226/74 X |
| 4,475,677 | 10/1984 | Rutishauser | 226/74 |
| 4,479,598 | 10/1984 | Mailer et al. | 226/74 |
| 4,569,468 | 2/1986 | Neer | 226/74 |
| 4,571,103 | 2/1986 | Kakeo et al. | 400/616.1 X |
| 4,616,773 | 10/1986 | Kerivan | 226/74 X |

FOREIGN PATENT DOCUMENTS

| | | |
|---|---|---|
| 0099120 | 1/1984 | European Pat. Off. . |
| 0099958 | 2/1984 | European Pat. Off. . |
| 3036642 | 5/1982 | Fed. Rep. of Germany . |
| 3229970 | 4/1983 | Fed. Rep. of Germany . |
| 2125339 | 3/1984 | United Kingdom . |

*Primary Examiner*—Stuart S. Levy
*Assistant Examiner*—Lynn M. Sohacki
*Attorney, Agent, or Firm*—Oblon, Fisher, Spivak, McClelland & Maier

[57] ABSTRACT

The invention provides a paper feed device for a printer which comprises a pin feed mechanism mounted for changing over movement between a pushing position and a drawing position, a guide plate for guiding sprocket paper to a platen from a position rearwardly of the pin feed mechanism in the pushing position, a pinch roller mounted on the guide plate for movement toward and away from the platen, a movable guide plate for guiding a cut sheet from between a front face of the pin feed mechanism and the platen to a contact point between the platen and the pinch roller, a pair of arms pivotally supported at opposite side ends of the movable guide plate, and supporting means located on opposite sides of the pin feed mechanism, the supporting means retracting the movable guide plate upwardly when the pin feed mechanism is changed over to the drawing position.

2 Claims, 9 Drawing Sheets

PAPER FEED DEVICE FOR A PRINTER

FIELD OF THE INVENTION AND RELATED ART STATEMENT

This invention relates to a paper feed device for a printer of the type which includes a pin feed mechanism for feeding a sprocket paper web having pin holes formed therein.

At first a typical one of conventional devices of the type will be described with reference to FIGS. 4 and 5. In particular, a pin feed mechanism 4 is mounted for pivotal motion about a support shaft 5 between a drawing or pulling position as shown in FIG. 4 and a pushing position as shown in FIG. 5. A pair of guide plates 8 and 8*a* for guiding a sprocket paper web 7 extends from individual positions behind and below the pin feed mechanism 4 toward different positions below a platen 3. A pinch roller 9 is mounted for movement into and out of engagement with the platen 3. As seen in FIG., 5, when printing on a cut sheet 11 is to be effected, the pinch roller 9 is pressed against the platen 3 to feed the cut sheet 11.

However, since the distance between the platen 3 and the guide plate 8 increases toward the rear from the pinch roller 9, the cut sheet 11 may be dislocated from a contact point between the platen 3 and the pinch roller 9 and float from the platen 3 so that it may be caught by a border between the pinch roller 9 and the guide plate 8. Accordingly, the position of a leading edge of the cut sheet 11 will become unstable, and hence even if the platen 3 is rotated a predetermined fixed angle, the print starting position of the cut sheet 11 cannot be determined. Besides, the cut sheet 11 may be caught by an end 8*b* of the guide plate 8*a*, and hence it is difficult to insert the cut sheet 11.

Thus, it has been proposed to provide a guide piece 19 for guiding the cut sheet 11 toward the contact point between the platen 3 and the pinch roller 9 as shown in FIG. 7 to facilitate insertion of the cut sheet 11. However, when a sprocket paper web 7 is to be drawn from the platen 3 as shown in FIG. 6 to print thereon, in order to guide the sprocket paper web 7 by means of the guide plate 8 and set it onto the platen 3, the pinch roller 9 must be contacted with the platen 3 to feed the sprocket paper web 7 to the pin feed mechanism 4. After setting the sprocket paper web 7 in position, the pinch roller 9 is retracted to allow the pin feed mechanism 4 to feed the sprocket paper web 7. But, upon setting the sprocket paper web 7 in such a manner, it may be put between the pinch roller 9 and a guide member 19 and be wrinkled or broken thereby so that it may sometimes become of no use.

Meanwhile, conventional pin feed mechanisms include a pair of left and right holders fitted both for sliding motion on a drive shaft and a guide shaft, and a rotary member mounted on each of the holders and having a plurality of projections around an outer periphery thereof, such as a pin wheel or a belt, whereby the rotary members are driven by the drive shaft to feed a paper web having a pair of rows of feed holes formed along opposite edges thereof. The guide shaft and the drive shaft are mounted at opposite ends thereof on a pair of left and right support plates.

In feeding a paper web on such a pin feed mechanism, the holders are pivoted upwardly or downwardly around the guide shaft between and are alternatively fixed to a drawing position for drawing paper from an upper portion of an outer periphery of the platen and a pushing or forcing position for pushing paper to a lower portion of the outer periphery of the platen.

However, in a device of the type in which holders and support plates are alternatively fixed to a drawing position and a pushing position, it is troublesome to mount a pin feed mechanism. In particular, since hubs fitted at opposite ends of a guide shaft are mounted on a pair of left and right frames, the pin feed mechanism cannot be removed before the hubs are removed from the guide shaft and then from the frames.

Due to such reasons, a pin feed mechanism which is alternatively positioned between a drawing position and a pushing position is handled as a standard equipment. Accordingly, such a pin feed mechanism is useless and therefore expensive to a user who does not necessitate pin feed but friction feed.

Besides, it is a problem that a selectively positioning or changing over mechanism is required to fix the pin feed mechanism between a drawing position and a pushing position, resulting in complication in structure.

Further, the device of the type has a function to contact a pinch roller with a platen to feed paper by friction, but it also has a drawback that even during friction feeding, the pin feed mechanism is driven and hence the load is high accordingly.

OBJECTS AND SUMMARY OF THE INVENTION

It is a first object of the present invention to provide a paper feed device for a printer of the type including a pin feed mechanism which is alternatively positionable between a drawing position and a pushing position, wherein insertion of a sprocket paper web can be effected easily when the pin feed mechanism is in the drawing position, and wherein, when printing is to be effected on a cut sheet, the print starting position of the cut sheet can be determined accurately.

It is a second object of the invention to provide a paper feed device for a printer which facilitates removing operation of a pin feed mechanism thereof and which has a simplified structure for holding the pin feed mechanism between a drawing position and a pushing position.

It is a third object of the invention to provide a paper feed device for a printer which has a simplified structure for alternatively positioning a support member for a pin feed mechanism between two positions.

It is a fourth object of the invention to provide a paper feed device for a printer which reduces the load upon friction feeding therein.

Other objects of the present invention will become apparent from the following description thereof.

According to an aspect of the present invention, there is provided a paper feed device for a printer, comprising a pin feed mechanism mounted for changing over movement between a pushing position and a drawing position, a guide plate for guiding sprocket paper to a platen from a position rearwardly of the pin feed mechanism in the pushing position, a pinch roller mounted on the guide plate for movement toward and away from the platen, a movable guide plate for guiding a cut sheet from between a front face of the pin feed mechanism and the platen to a contact point between the platen and the pinch roller, a pair of arms pivotally supported at opposite side ends of the movable guide plate, and supporting means located on opposite sides of the pin feed mechanism, the supporting means retracting the movable guide plate upwardly when the pin feed mechanism is changed over to the drawing position.

Accordingly, when printing is to be effected on a sprocket paper web, the pin feed mechanism is selectively positioned either to the pushing position or to the drawing position. In the pushing position, the movable guide plate guides the sprocket paper web to the platen while it guides a cut sheet to the contact point between the platen and the pinch roller. On the other hand, if the pin feed mechanism is changed over to the drawing position, the movable guide plate is retracted upwardly. Accordingly, the sprocket paper web inserted along the guide plate can be fed smoothly by cooperation of the pinch roller with the platen until it is caught by the pin feed mechanism.

According to another aspect of the invention, there is provided a paper feed device for a printer which comprises a frame having a recess formed therein for receiving a guide shaft of a pin feed mechanism therein, the frame having a flexible piece provided thereon, the flexible piece having a pressing face adapted to resiliently contact with an end face of the guide shaft, the flexible piece further having a projection for pressing the guide shaft against the bottom of the recess of the frame, and a spring plate mounted on the frame and having engaging portions for resiliently engaging with part of a support member which supports ends of the guide shaft and a drive shaft.

Accordingly, by resiliently retracting the flexible piece outwardly, the pin feed mechanism can be assembled and disassembled very easily.

Besides, by engaging part of the support member with one of the engaging portions of the spring plate, the support member can be selectively positioned between the drawing position and the pushing in position together with the support member.

In addition, where the spring plate has up to three engaging portions for engaging with the support member and when the support member is engaged with a mid one of the three engaging portions, a drive force is not transmitted to the pin feed mechanism, and hence the load can be reduced.

DETAILED DESCRIPTION OF THE PREFERRED EMBODIMENTS

Figure 2:
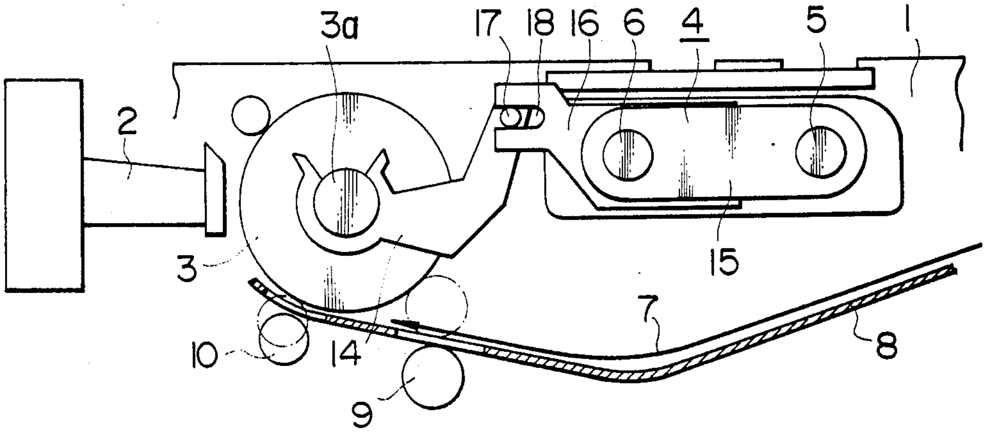
FIG. 2 is a side elevational view, partly in section, illustrating a pin feed mechanism of the paper feed device of FIG. 1 in a drawing position to set a sprocket paper web in position.
Figure 3:
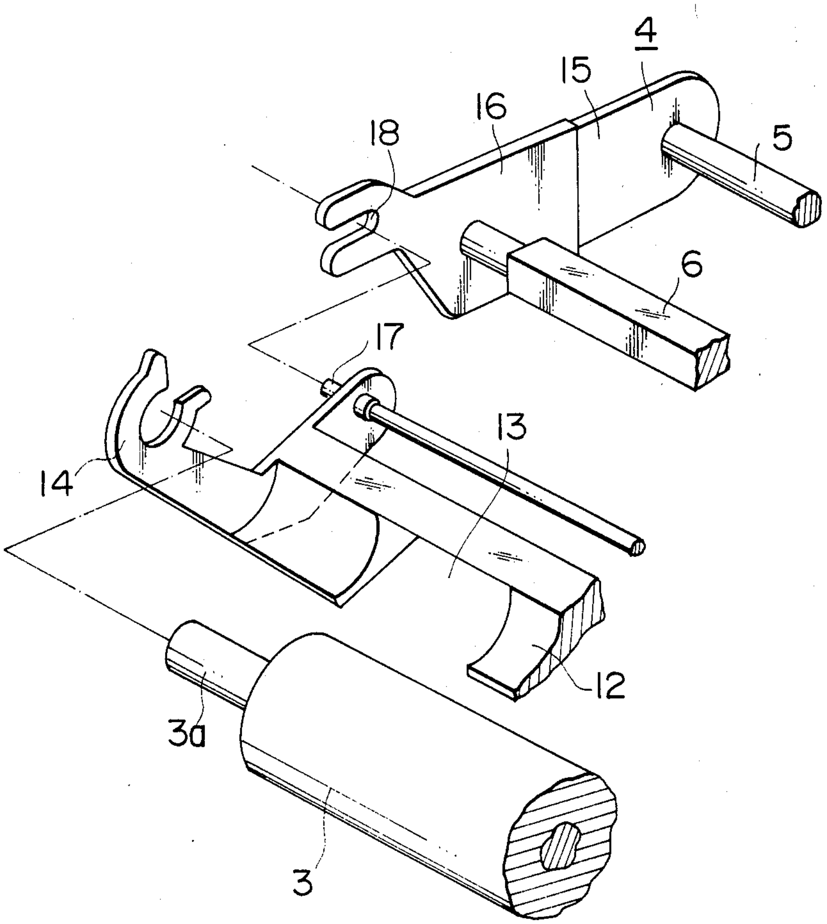
FIG. 3 is a fragmentary perspective view, partly in section, illustrating essential parts of the paper feed device of FIG. 1.
Figure 4:
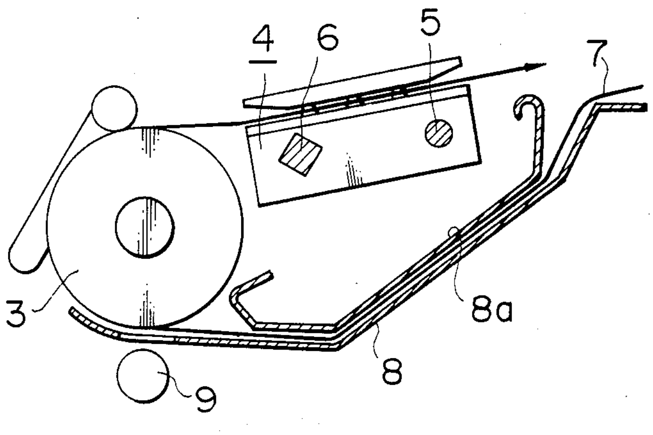
FIG. 4 PRIOR ART
FIG. 4 is a side elevational view, partly in section, illustrating a typical one of conventional paper feed devices.
Figure 5:
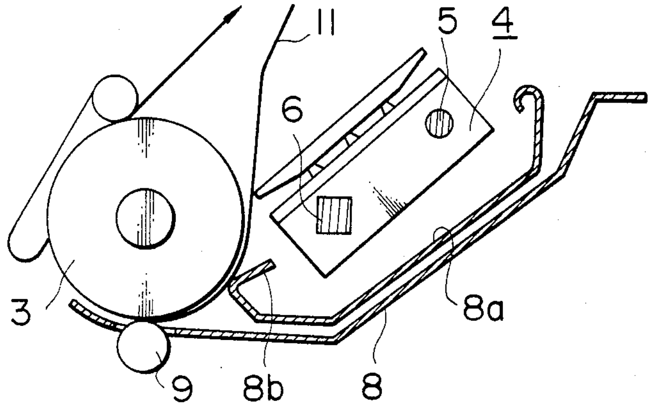
FIG. 5 PRIOR ART
FIG. 5 is a side elevational view, partly in section, illustrating the conventional paper feed device of FIG. 4 during printing on a cut sheet.
Figure 6:
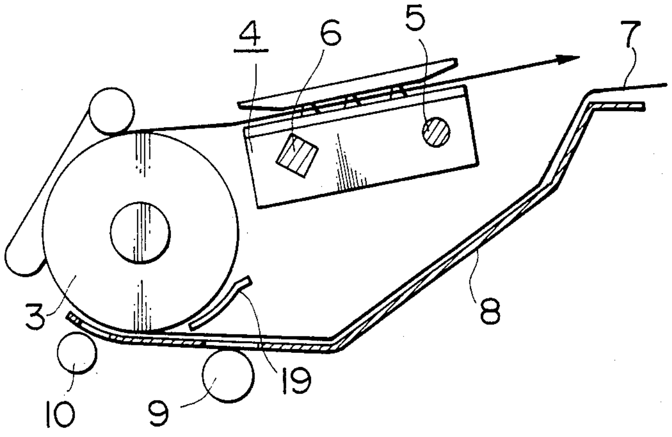
FIG. 6 PRIOR ART
FIG. 6 is a side elevational view, partly in section, illustrating another typical one of conventional paper feed devices.
Figure 7:
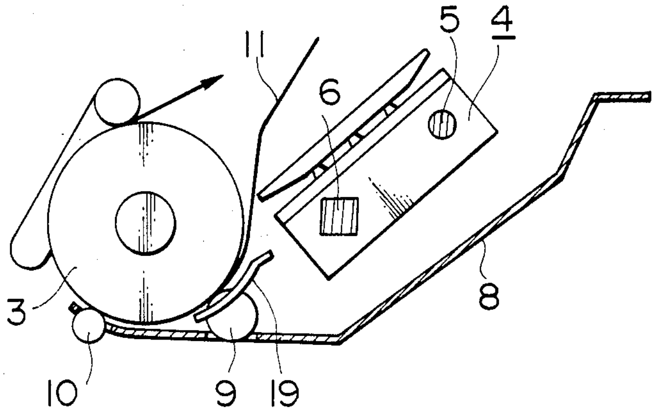
FIG. 7 PRIOR ART
FIG. 7 is a side elevational view, partly in section, illustrating the paper feed device of FIG. 6 during printing on a cut sheet.
Figure 8:
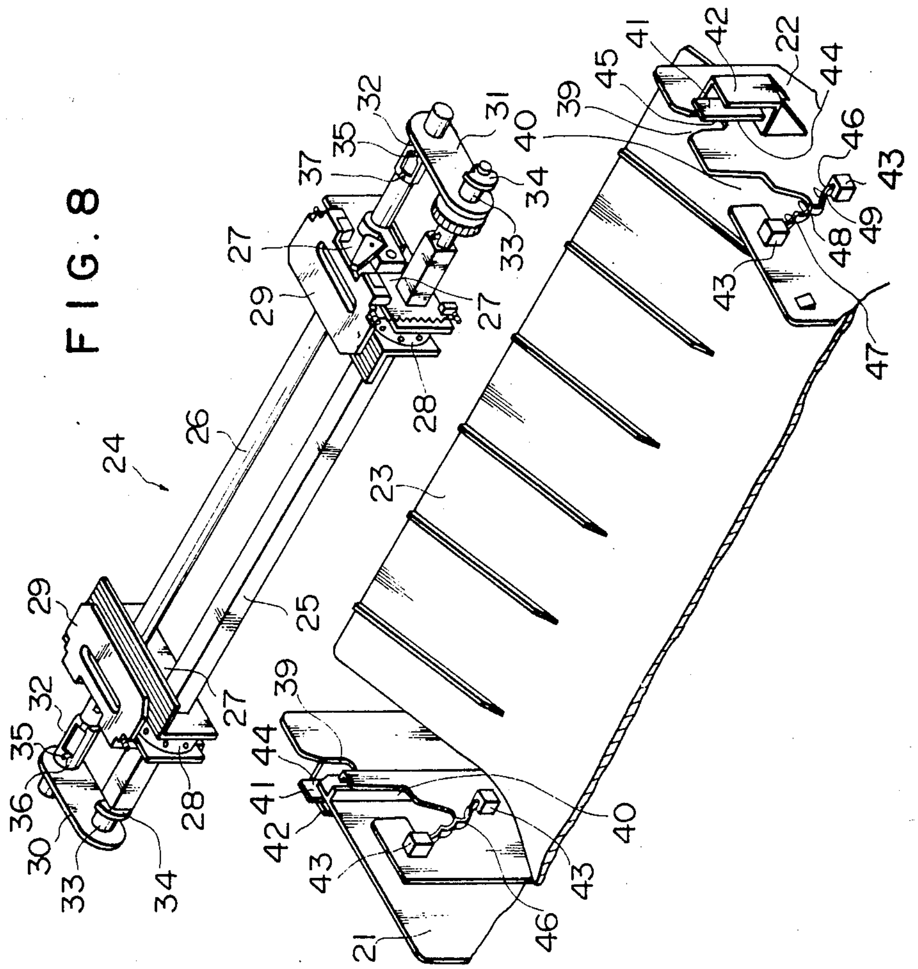
FIG. 8 is a fragmentary perspective view illustrating a paper feed device according to a second embodiment of the invention.

At first, a first embodiment of the present invention will be described with reference to FIGS. 1 to 3. A print head 2 and a platen 3 are mounted on a frame 1, and a pin feed mechanism 4 is mounted for alternative pivotal motion around a support shaft 5 between a lower pushing or forcing position (FIG. 1) and an upper drawing or pulling position (FIG. 2). The pin feed mechanism 4 includes a drive shaft 6 which is driven by a motor to feed a sprocket paper web 7. A guide plate 8 is provided to guide the sprocket paper web 7 from a position below and rearwardly of the pin feed mechanism 4 and is arranged so that it may not interfere with the pin feed mechanism 4 in the pushing position. A pair of pinch rollers 9 and 10 are mounted for movement toward and away from platen 3 through the guide plate 8.

A movable guide plate 12 is additionally provided for guiding a cut sheet 11 from between a front face of the pin feed mechanism 4 and an upper part of the platen 3 to a contact point between the platen 3 and the pinch roller 9 when the pinch rollers 9 and 10 are contacted with the platen 3. The movable guide plate 12 has formed therein a recess 13 for escaping the pinch roller 9 therefrom and has formed thereon an arm 14 which is pivotally held around each end of a shaft 3*a* of the platen 3. A support 16 in the form of a plate is secured to each side of the pin feed mechanism 4, that is, to each one of a pair of plates 15 provided for supporting the support shaft 5 and the drive shaft 6. The supports 16 have each formed therein a guideway 18 in which a pin 17 which extends from the arm 14 is supported.

Figure 1:
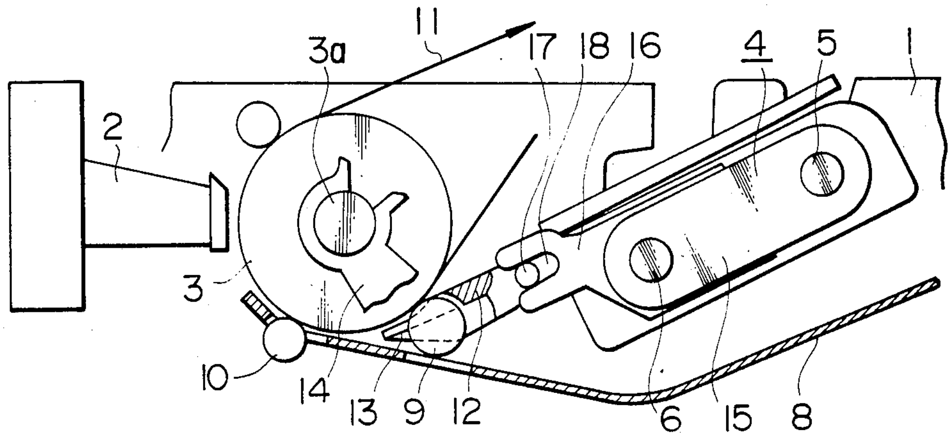
FIG. 1 is a side elevational view, partly in section, illustrating a paper feed device according to a first embodiment of the present invention during printing on a cut sheet.

In such a construction as described just above, when a cut sheet 11 is to be loaded, the pin feed mechanism 4 will be pivoted around the support shaft 5 to the lower pushing position in which the movable guide plate 12 extends adjacent the platen 3, as seen in FIG. 1. Accordingly, the cut sheet 11 can be guided to a contact point between the platen 3 and the pinch roller 9. In other words, a leading edge of the cut sheet 11 is positioned so that it may be drawn to the front face of the print head 2 with an accurate feeding amount in accordance with a rotational angle of the platen 3. Accordingly, the print starting position and the top margin can be taken with accuracy.

When printing at the pushing position of the pin feed mechanism in FIG. 1 using a sprocket paper web 7, the pinch rollers 9 and 10 are retracted from their respective positions as described above. Also in this instance, the sprocket paper web 7 which has been pushed to the platen 3 is guided by the movable guide plate 12.

As the pin feed mechanism 4 is pivoted around the support shaft 5 to the drawing position as shown in FIG. 2, the movable guide plate 12 is retracted upwardly around the shaft 5. Accordingly, the sprocket paper web 7 which has been guided by the guide plate 8 can be smoothly fed in by the pinch rollers 9 and 10 until it is caught by the pin feed mechanism 4.

Further, since the movable guide plate 12 operates in response to a changing over operation of the pin feed mechanism 4 between the drawing and pushing positions, an operation error can be prevented.

A second embodiment of the present invention will now be described with reference to FIGS. 8 to 15. A paper pan 23 is supported on a pair of left and right frames 21 and 22. A pin feed mechanism 24 includes a drive shaft 25, a guide shaft 26, a pair of left and right holders 27 fitted for sliding movement on the shafts 25 and 26, a rotary member 28 in the form of a belt supported for rotation on each of the holders 27, a paper holder 29 mounted for rising and falling movement on each of the holders 27, and a pair of left and right support members 30 and 31. The support members 30 and 31 have integrally fromed thereon a cylindrical portion 32 which is adapted to be fitted with the guide shaft 26 and a bushing 33 for rotatably supporting the drive shaft 25 therein. A flange 34 is formed at an end of the bushing 33. The bushing 33 has formed at the cylindrical portion 32 thereof a recess 36 which is adapted to engage with a pin 35 mounted on the guide shaft 26 to hold the bushing 33 against rotation, and a pawl 38 which is adapted to resiliently engage with a groove 37 formed around the guide shaft 26.

The frames 21 and 22 have integrally formed thereon a recess 39 for supporting either end of the guide shaft 26, another recess 40 for receiving the bushing 33 therein, a flexible piece 41 mounted in opposing relationship to either end of the guide shaft 26, a stopper 42 for preventing the flexible piece 41 from being excessively bent in an outward direction, and a pair of catches 43 located above and below the recess 40. The flexible piece 41 has a pressing face 44 and a projection 45 integrally formed thereon. A spring plate 46 is held at opposite upper and lower ends thereof by the catches 43 and has engaging portions 47, 48 and 49 formed thereon which are adapted to resiliently engage with part of the support member 30 or 31, that is, the bushing 33.

Figure 9:
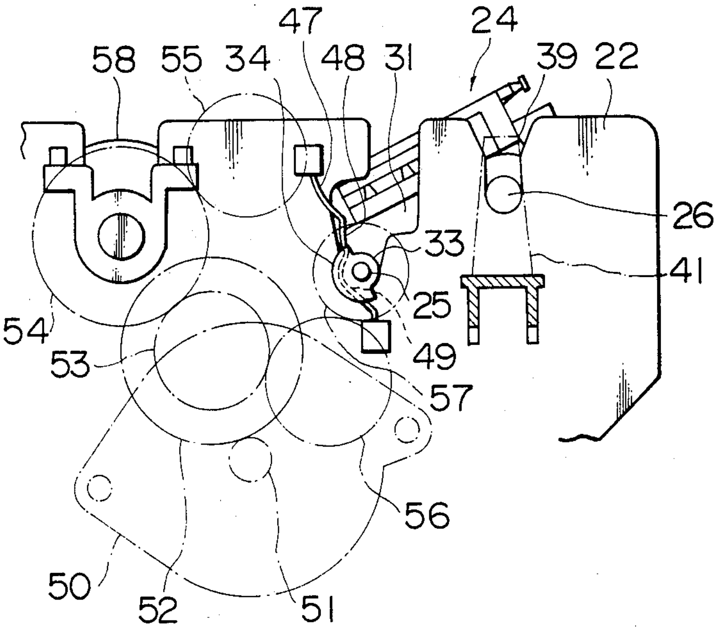
FIG. 9 is a side elevational view illustrating a support member of the device of FIG. 8 in a pushing position.
Figure 10:
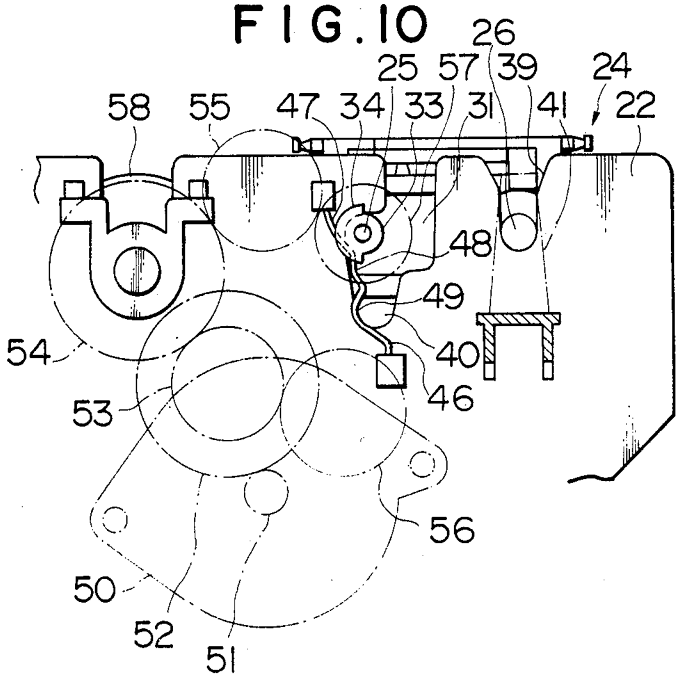
FIG. 10 is a side elevational view illustrating the support member of FIG. 9 in a drawing position.

As shown in FIGS. 9 and 10, the frame 22 supports thereon a motor 50, a train of gears 51, 52 and 53 for serially transmitting rotation of the motor 50 to a platen gear 54, an idler gear 55 for transmitting rotation of the platen gear 54 to an input gear 57 secured to an end of the drive shaft 25, and another idler gear 56 for transmitting rotation of the gear 52 to the input gear 57. The platen gear 54 is secured to an end of a platen 58.

In this construction, the bushings 33 are inserted into the recesses 40 and engaged with the spring plates 46, and then the guide shaft 26 is pushed into the recesses 39. By the pushing force, the flexible pieces 41 are deflected outwardly to allow the guide shaft 26 to enter below the projection 45. The guide shaft 26 is thus pressed against the bottoms of the recesses 39 by the projections 45 while the movement of the guide shaft 26 in the thrust direction is prevented by the pressing faces 44 of the flexible pieces 41. If the flexible pieces 41 are deflected outwardly, the pin feed mechanism 24 can be disassembled simply from the frames 21 and 22.

Figure 11:
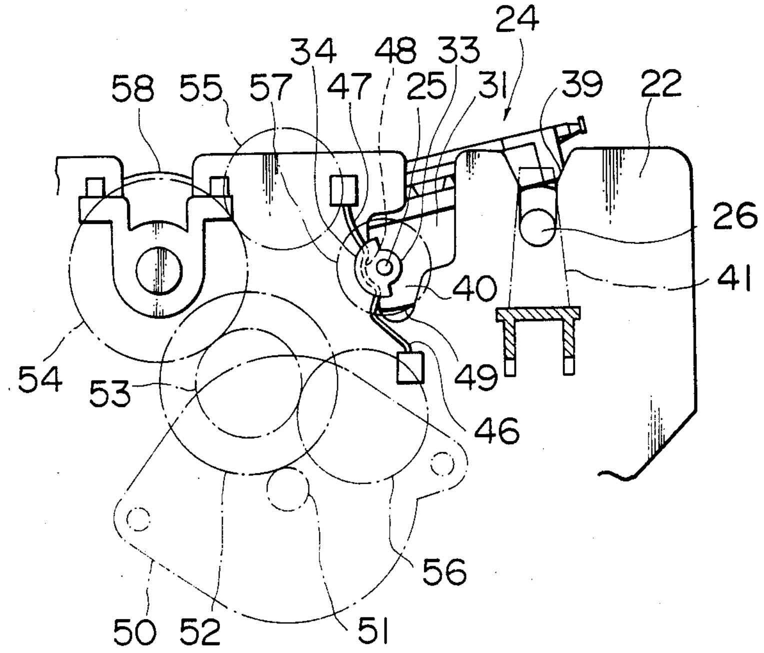
FIG. 11 is a side elevational view illustrating the support member positioned in a mid position between the pushing position and the drawing position.
Figure 12:
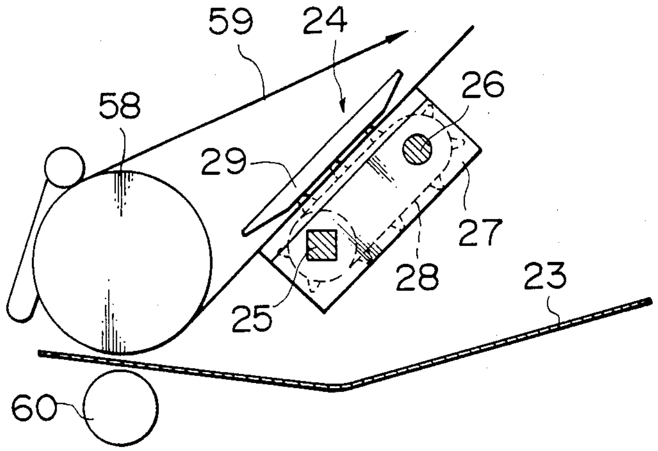
FIG. 12 is a side elevational view illustrating paper to be pushed to a platen.
Figure 13:
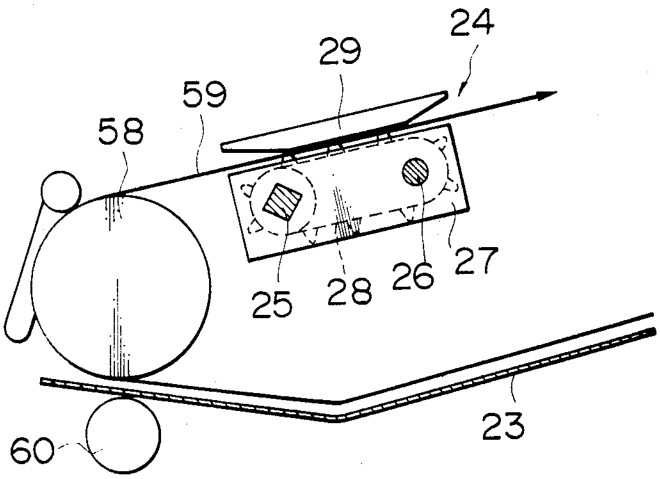
FIG. 13 is a side elevational view illustrating paper to be drawn from the platen.
Figure 14:
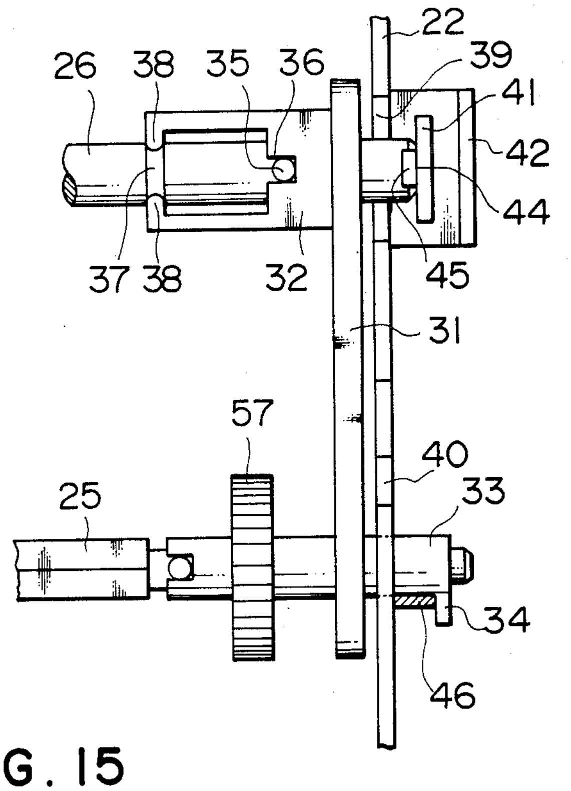
FIG. 14 is a plan view illustrating, in an enlarged scale, a mounting structure for a guide shaft and a support member.
Figure 15:
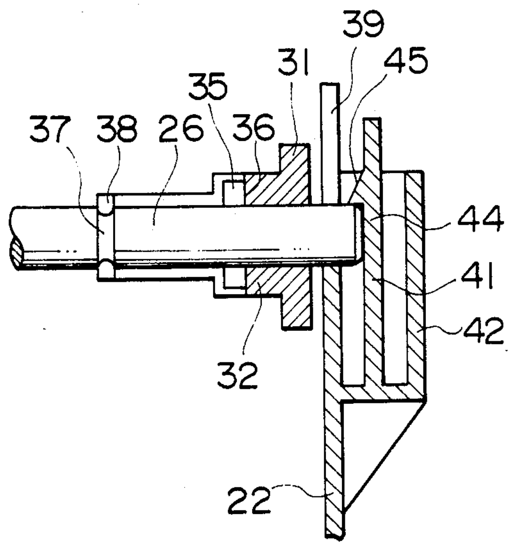
FIG. 15 is a vertical sectional side elevational view illustrating, in an enlarged scale, a portion of the mounting structure for the guide shaft of FIG. 14.

When the bushings 33 are in a position engaged with the lower engaging portions 49 of the spring plates 46 while the pin feed mechanism 24 is mounted in position, the support members 30 and 31 are in a pushing position pivoted downwardly around the guide shaft 26 together with the holders 27 as shown in FIG. 9 while the input gear 57 is in meshed engagement with the idler gear 56 so that paper 59 may be pushed toward a position below the platen 58 as seen in FIG. 12. Meanwhile, when the bushings 33 are in another position engaged with the upper engaging portions 47 of the spring plates 46, the support members 30 and 31 are in a drawing position pivoted upwardly as shown in FIG. 10 while the input gear 57 is in meshed engagement with the idler gear 55 so that paper 59 may be drawn from an upper part of the platen 58 as seen in FIG. 13. On the other hand, when the pinch roller 60 is contacted with the platen 58 to effect friction feeding, the bushings 33 are engaged with the mid engaging portions 48 of the spring plates 56 as seen in FIG. 11. In this condition, the input gear 57 can be held in a position in which it is not engaged with either of the idler gears 55 and 56. Accordingly, the load to the motor 50 can be reduced.

While the bushings 33 move along the spring plates 46 in this manner, the flanges 34 thereof are engaged with one side edges of the spring plates 46 so that they prevent the spring plates 46 from being dislocated from the bushings 33. Further, the pin feed mechanism 24 can be assembled and disassembled easily by a dealer or a user. Accordingly, the pin feed mechanism 24 can be treated as an option so that a user can buy it optionally. The structure of a mechanism for selectively positioning the support members 30 and 31 can be made very simple with the spring plate 46 added to the frame 22.

What is claimed is:

1. A paper feed device for a printer, comprising:
   a pin feed mechanism positionable in a pushing position for pushing sprocket paper around a platen and a drawing position for drawing sprocket paper from around said platen,
   a frame on which said pin feed mechanism is mounted for selective pivotal motion between said pushing position and said drawing position,
   a guide plate for guiding sprocket paper to said platen from a position rearwardly of said pin feed mechanism when said pin feed mechanism is in said pushing position,
   a pinch roller mounted on said guide plate for movement toward and away from said platen,
   a movable guide plate positioned for guiding a cut sheet from between a front face of said pin feed mechanism and said platen to a contact point between said platen and said pinch roller when said pin feed mechanism is in said pushing position,
   a pair of arms pivotally supported at opposite side ends of said movable guide plate and mounted for pivotal motion around an axis of said platen, and
   supporting means located on opposite sides of said pin feed mechanism, said supporting means being coupled to said movable guide plate to retract said movable guide plate upwardly and out of a path of sprocket paper drawn by said feed mechanism when said pin feed mechanism is selectively moved to said drawing position.

2. A paper feed device for a printer according to claim 1, wherein said supporting means comprise pin means mounted on said movable guide plate and guide means formed in said arms for supporting said pin means.

* * * * *